United States Patent
Sanchez Vega

(10) Patent No.: US 10,330,345 B1
(45) Date of Patent: Jun. 25, 2019

(54) MECHANICAL SOLAR TRACKING AND SOLAR CONCENTRATOR

(71) Applicant: The Regents of the University of Colorado, a body corporate, Denver, CO (US)

(72) Inventor: L. Rafael Sanchez Vega, Westminster, CO (US)

(73) Assignee: The Regents of the Univarsity of Colorado, a Body Corporate, Denver, CO (US)

( * ) Notice: Subject to any disclaimer, the term of this patent is extended or adjusted under 35 U.S.C. 154(b) by 28 days.

(21) Appl. No.: 15/581,946

(22) Filed: Apr. 28, 2017

Related U.S. Application Data

(60) Provisional application No. 62/328,648, filed on Apr. 28, 2016.

(51) Int. Cl.
  *F24S 20/30* (2018.01)
  *F24S 30/458* (2018.01)
  *F24S 30/00* (2018.01)

(52) U.S. Cl.
  CPC ............. *F24S 20/30* (2018.05); *F24S 30/458* (2018.05); *F24S 2030/115* (2018.05); *F24S 2030/145* (2018.05)

(58) Field of Classification Search
  CPC ........................................................ F24J 2/38
  USPC ......... 385/33; 250/203.4; 136/246; 126/424, 126/440; 353/3; 188/382; 4/678
  See application file for complete search history.

(56) References Cited

U.S. PATENT DOCUMENTS

| | | | | |
|---|---|---|---|---|
| 4,387,702 | A * | 6/1983 | Murphy | F24S 30/455 126/581 |
| 6,363,928 | B1 * | 4/2002 | Anderson, Jr. | G01S 3/7861 126/577 |
| 7,989,746 | B2 * | 8/2011 | Chen | H02S 20/00 250/203.4 |
| 8,499,756 | B2 * | 8/2013 | Bathurst | H02S 20/00 126/581 |
| 8,763,601 | B2 * | 7/2014 | Doyle | F24J 2/10 126/604 |

(Continued)

FOREIGN PATENT DOCUMENTS

EP  2194343 A1  6/2010

*Primary Examiner* — Lori L Baker
(74) *Attorney, Agent, or Firm* — Nicholas Pfeifer; Smith & Hopen, P.A.

(57) ABSTRACT

A mechanical solar tracking and solar concentrating system having a Fresnel lens, moving frame, track, retaining mechanism, and solar collector. The lens focuses solar energy at the collector; the frame holds the collector and lens, keeping them aligned as the frame rotates; the track guides the frame to maintain a perpendicular orientation to the Sun; the solar collector receives the Sun's rays; and the retaining mechanism releases at established intervals, allowing the frame to rotate to the next location. The cycle repeats, tracking the Sun and concentrating its rays at a focal point, to generate temperatures at the focal point in excess of 500° C. These high temperatures can be exploited in several applications, such as producing drinking water from dirty water; cooking food; disinfecting medical instruments; accelerating fermentation of certain types of flora to produce electricity; generating work for generic purposes; etc.

15 Claims, 15 Drawing Sheets

(56) References Cited

U.S. PATENT DOCUMENTS

| | | | | |
|---|---|---|---|---|
| 8,939,648 B2 * | 1/2015 | Schneider | ............... | F16C 17/02 |
| | | | | 384/428 |
| 2009/0250094 A1 * | 10/2009 | Robison | .................... | G02F 1/29 |
| | | | | 136/246 |
| 2015/0063751 A1 * | 3/2015 | Tremblay | ............. | G02B 6/0013 |
| | | | | 385/33 |

* cited by examiner

MECHANICAL SOLAR TRACKING AND SOLAR CONCENTRATOR

CROSS-REFERENCE TO RELATED APPLICATIONS

This nonprovisional application is a continuation of and claims priority to provisional application No. 62/328,648, entitled "Mechanical Solar Tracking and Solar Concentrator," filed Apr. 28, 2016 by the same inventors.

BACKGROUND OF THE INVENTION

1. Field of the Invention

This invention relates, generally, to solar energy concentrators. More specifically, it relates to a solar concentrator system capable of automatically tracking the sun.

2. Brief Description of the Prior Art

The Sun is an immense and available energy source which has yet to be fully employed.

In Denver, Colo., for example, the Sun produces on average roughly 700 watts/sq. meter of energy. One of the difficulties associated with solar energy collection, is tracking the constantly moving Sun. A solar energy collector needs to have the ability to track the Sun in order to take full advantage of the dispersed energy. Traditional tracking systems, however, typically require motors and controllers, which use energy that can potentially negate the benefit of economically collecting solar energy.

Accordingly, what is needed is system capable of mechanically tracking the Sun while collecting energy from the Sun's rays for further use. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a more efficient solar tracking and collecting system is now met by a new, useful, and nonobvious invention.

The novel structure includes a lens secured to a first end of a frame and a solar collector secured near the second end of the frame. The solar collector is located at a distance from the lens that is generally equal to focal length of the lens. The frame further includes a vertical pivoting axis and a horizontal pivoting axis to maintain proper alignment with the Sun.

The system includes a tracking guide proximate the second end of the frame. The tracking guide has a plurality of stopping members spaced at predetermined intervals and at least one guiding member. The guiding member aids in maintaining the pitch of the device while the stopping members aid in keeping the device aligned with the Sun as it travels through the sky.

A retaining/releasing mechanism is attached to the second end of the frame and is adapted to engage and disengage with the plurality of stopping members. An actuator is in communication with the retaining/releasing mechanism, and controls whether the retaining/releasing mechanism engages or disengages the plurality of stopping members.

In addition, the system includes a biasing member applying a constant biasing force on the frame. The biasing force causes the frame to rotate about the vertical axis of the frame when the retaining/releasing mechanism is disengaged with the plurality of stopping members.

An embodiment includes a timer in communication with the actuator. The timer controls the actuation of the actuator and is preferably powered through a battery source or solar panels.

An embodiment of the retaining/releasing mechanism includes a piston rod that has a first position of repose and a second actuated position. The movement between the first and second positions is controlled by the actuator. The first position of repose includes the piston rod extended outward at a distance that results in the piston rod contacting one of the plurality of stopping members when the frame rotates the piston rod into contact with the one of the plurality of stopping members. The second actuated position includes the piston rod retracted inward such that the piston rod is incapable of contacting one of the plurality of stopping members.

An embodiment of the tracking guide employs two guide members extending generally in parallel relation to each other. The plurality of stopping members intersects a plane extending perpendicularly between the two guide members. In addition, the stopping members are distally located from the lens at a distance greater than the distance between the lens and the two guide members. Furthermore, the retaining/releasing mechanism extends distally beyond the two guide members such that the retaining/releasing mechanism at least partially resides between the two guide members.

In an embodiment, the retaining/releasing mechanism has a lever arm pivotally secured thereto with a first end of the lever in mechanical communication with the piston rod and a second free end. The piston rod is thereby adapted to move the lever arm into a first extended position or a second retracted position. The first extended position of the lever arm is achieved when the piston rod is in the first position of repose. When in the first extended position, the lever arm's second free end extends distally beyond the plurality of stopping members such that the second free end is capable of contacting one of the plurality of stopping members. The lever arm is in the second retracted position when the piston rod is in the second actuated position. In the second retracted position, the second free end of the lever arm resides proximally to the plurality of stopping members such that the second free end is incapable of contacting one of the plurality of stopping members.

An embodiment of the tracking guide has two guide members temporarily secured to a semi-spherical shell. The shell has a plurality of apertures equidistantly disposed therein, such that the plurality of stopping members are each defined by a perimeter of one of the plurality of apertures. The two guide members extend generally in parallel relation to each other and the spherical shell is distally located from the lens at a distance greater than the distance between the lens and the two guide members. The retaining/releasing mechanism extends distally beyond the two guide members such that the retaining/releasing mechanism at least partially resides between the two guide members.

In an embodiment, the actuator is a pressure operated piston adapted to receive thermal energy received by the solar collector causing a piston rod to extend outward from the piston which in turn actuates the retaining/releasing mechanism. The retaining/releasing mechanism further includes a lever arm in communication with the piston rod, wherein the translation of the piston rod moves the lever arm between contacting and non-contacting positions with respect to the stopping members. The contacting position prevents the frame from rotating about the vertical axis of the frame and the non-contacting position allows the frame to rotate a predetermined distance about the vertical axis of the frame. The retaining/releasing mechanism may also include the piston rod in communication with a valve on the piston. The piston rod is adapted to open the valve to release the pressure within the piston when the piston rod extends past a predetermined threshold and close the valve when the piston rod is no longer extended beyond the threshold.

An embodiment of the retaining/releasing mechanism further comprises a lever in communication with the actuator. The lever has an open position and a closed position. The actuator alters the lever between the closed and open positions in accordance with a programmable digital timer, and the closed position is capable of temporarily preventing the frame from rotating about its vertical axis.

In an embodiment, the lens is a plano-convex lens consisting of a flat layer of series of thin, concentric annual grooves that correspond to the outer layer geometry of a standard spherical lens.

An embodiment also includes mechanisms for harnessing the energy of concentrated solar rays.

It is, therefore, an object of the present invention to provide a novel solar tracking system which utilizes solar energy and mechanical forces to track the Sun.

It is another object of the present invention to increase the accuracy and reduce the expense of solar tracking systems.

An additional object of the present invention is to provide an inexpensive, yet accurate, solar tracking system functioning in response to solar energy alone.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The present invention is a mechanical solar concentrator system that automatically tracks the Sun using minimal or no electricity. The system includes a frame securing a lens that is perpendicularly oriented to the Sun's rays and a solar collector that receives the Sun's rays.

The frame is under a constantly applied mechanical force attempting to rotate the frame about the vertical axis, e.g. a spring, and/or a measured mechanical imbalance applying a constant rotational force to the frame about a vertical axis. In addition, a release/retaining mechanism secured to the frame is in communication with a tracking guide that guides the rotation and pitch of the frame. The frame is also capable of pivoting along two axes—a horizontal and vertical axis. The two pivoting axes and track allow the frame to maintain alignment with the Sun. After the track is manually pre-adjusted according to the azimuth and elevation angles defined by the position of the Sun (data is available), the system will automatically guide the frame and lens according to the travel of the Sun.

At an established pressure, temperature, or time setting, retaining/releasing mechanism releases the frame allowing the lens and frame to rotate to a position corresponding with the Sun's current position in the sky at which point the retaining/release mechanism temporarily secures the location of the frame. The cycle repeats and the frame tracks the Sun throughout the day unattended.

Figure 1:
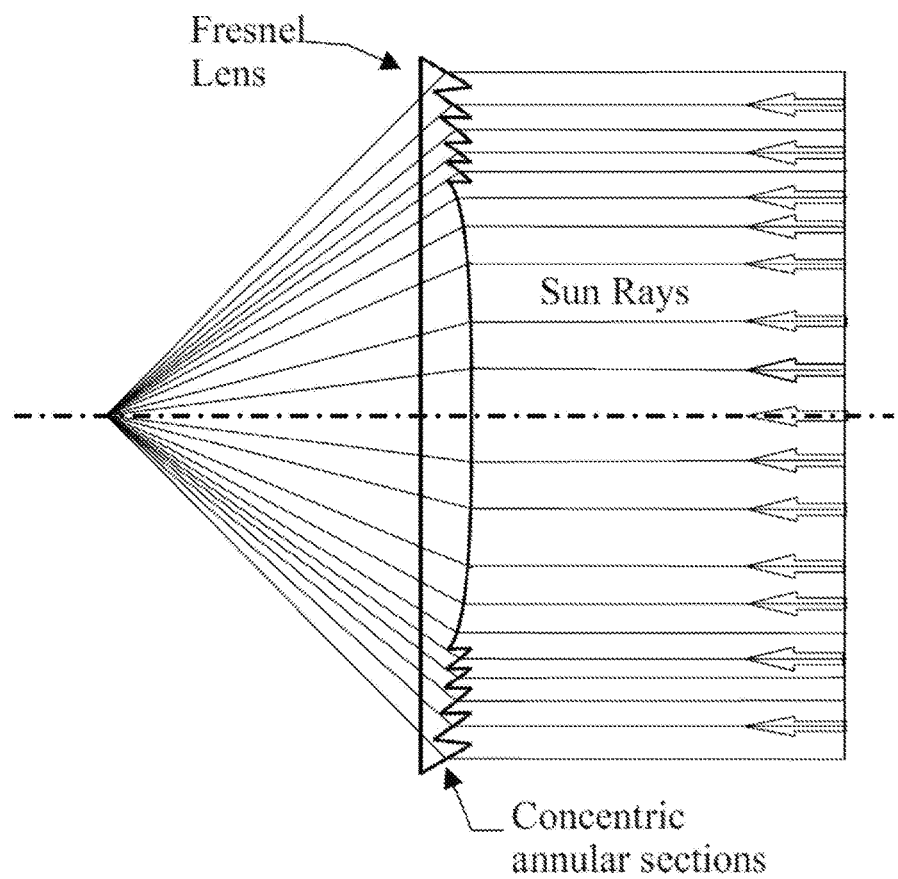
FIG. 1 depicts the manner in which a Fresnel lens focuses solar rays.

The system preferably uses a Fresnel lens, which can concentrate and focus sunlight as shown in FIG. 1 to generate high temperatures in excess of 500 degrees Celsius. These high temperatures (thermal energy) can be exploited in various applications, such as producing drinking water from dirty water by condensation of steam, heating and cooking food, disinfecting medical instruments, using heated air byproducts to accelerate fermentation of certain types of flora to produce electricity, generating work for generic purposes, or any other application known to a person having ordinary skill in the art.

Figure 2:
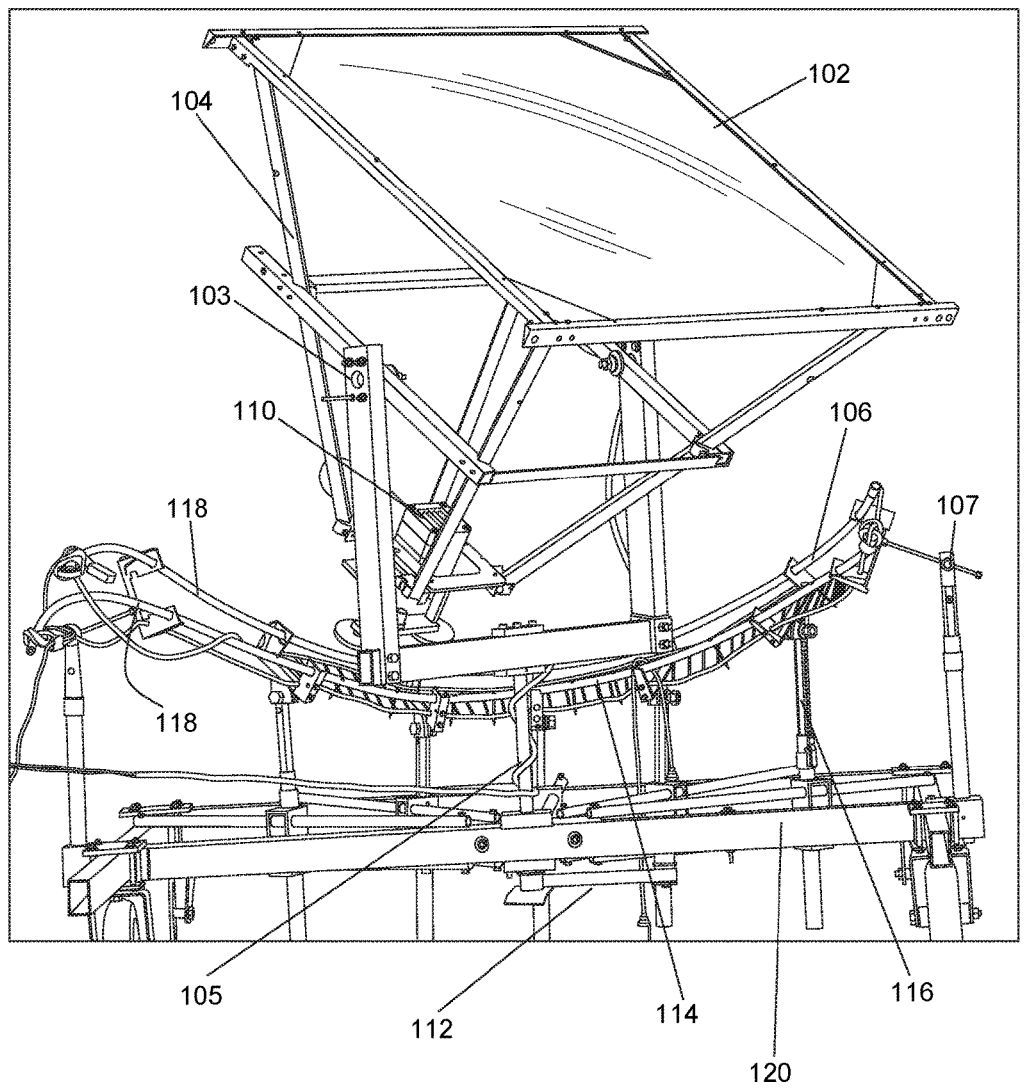
FIG. 2 is a perspective view of an embodiment of the present invention.

Referring now to FIG. 2, an embodiment of the present invention includes Fresnel lens 102 secured to a first end of moveable frame 104. Moveable frame 104 includes solar collector 110 and retaining/releasing mechanism 108 proximate the second end. Moveable frame 104 is configured to support lens 102 and solar collector 110 with an unobstructed path between lens 102 and solar collector 110. The distance between lens 102 and collector 110 is preferably the focal length of lens 102.

Moveable frame 104 is preferably configured to adjust the angle/pitch of lens 102 and collector 110 through a pivoting point such as pivoting attachment 103. Moveable frame 104 is also in rotational communication with rotational spring 112 through vertical member 105. Rotational spring 112 applies a constant spring force on vertical member 105, which cause moveable frame 104 to rotate when permitted by retaining/releasing mechanism 108 (not visible). The combination of pivoting and rotational abilities of frame 104 allow the system to track the Sun at varying azimuths in the sky with lens 102 in a generally perpendicular orientation with respect to the Sun's rays.

The embodiment also includes tracking guide 106, which includes a series of incremental stopping members 114. The system is able to rely on the interaction of tracking guide 106 and retaining/releasing mechanism 108 to control the rotation of moveable frame 104. As will be explained further below, the operation of retaining/releasing mechanism 108 can be controlled mechanically or through a cyclical digital timer relay.

As depicted in the embodiment in FIG. 2, tracking guide 106 is secured to a series of adjustable track supports 116, which are preferably secured to a fixed base frame 120. Each track support 116 can be specifically located at a desired height to ensure that tracking guide 106 forces frame 104 into a proper angle with respect to the azimuth of the Sun. Track supports 116 also preferably include pivoting attachment 107 to angle tracking guide 106 to correspond with the desired pitch of frame 104.

In an embodiment, tracking guide 106 also includes two guide members 118, preferably arranged in parallel relation to each other, which keeps retaining/releasing mechanism 108 between guide members 118, and in turn, keeps frame 104 at a predetermined angle while frame 104 rotates.

Figure 3:
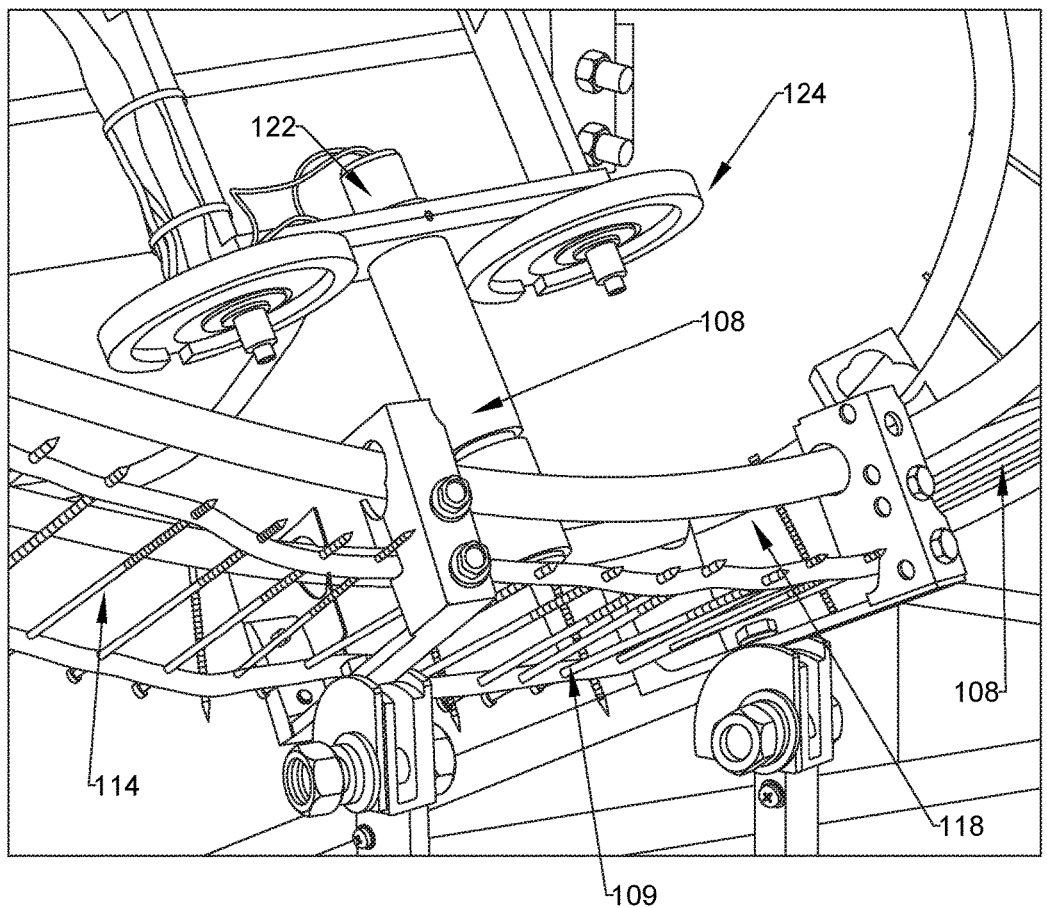
FIG. 3 is a close-up side view of an embodiment of the retaining/release mechanism.
Figure 4:
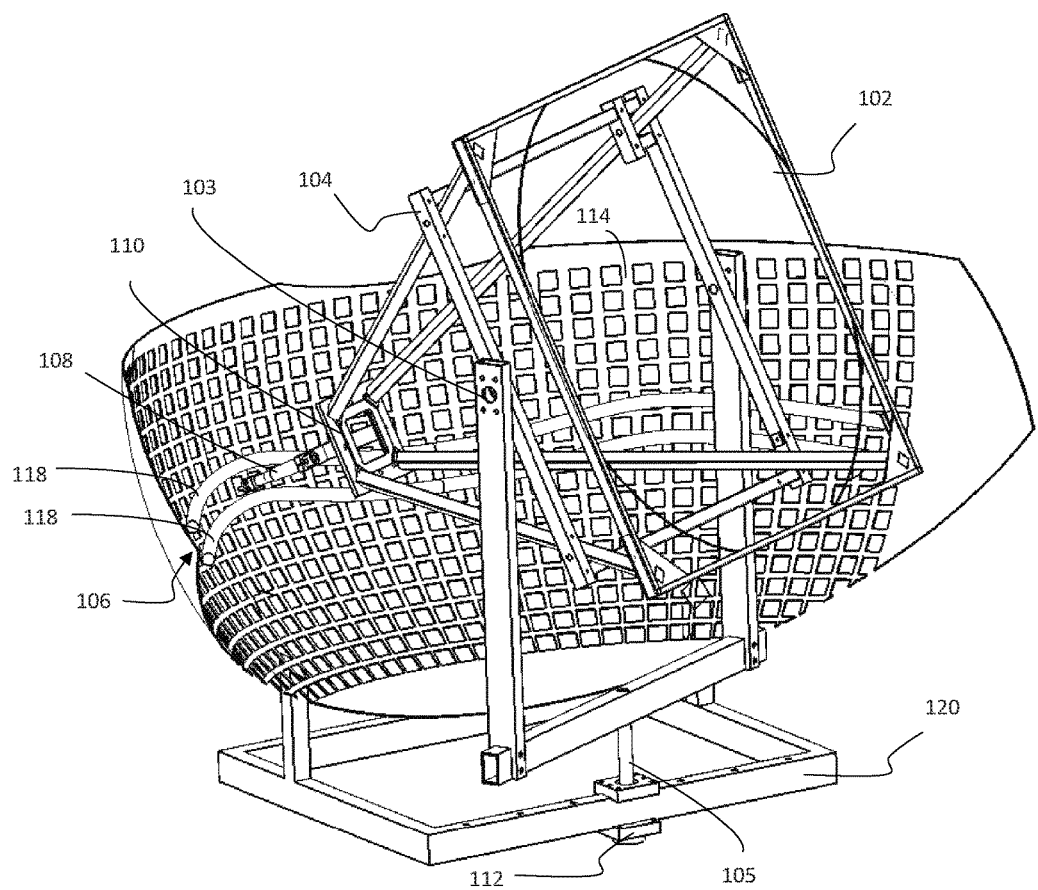
FIG. 4 is a perspective view of an embodiment of the present invention.

Referring now to FIGS. 2-3 in conjunction, an embodiment of retaining/releasing mechanism 108 includes piston rod 109 that has a retracted and an extended configuration. In the retracted position, piston rod 109 of retaining/releasing mechanism 108 does not contact stopping members 114 in tracking guide 106, which allows frame 104 to rotate. In the extended position, retaining/releasing mechanism 108 contacts stopping members 114 in tracking guide 106, which prevents frame 104 from rotating.

As best depicted in FIG. 3, stopping members 114 are spaced at predetermined intervals to aid frame 104 in incrementally rotating in sync with the Sun. During operation, retaining/releasing mechanism 108 will retract and extend piston rod 109 at predetermined intervals to allow piston rod 109 to retract and disengaged with one stopping member 114 and then extend and reengage with a subsequent stopping member 114 along its path of rotation.

In the exemplary embodiment in FIG. 3, retaining/releasing mechanism 108 is controlled via a battery powered piston actuator 122, such as a solenoid. Actuator 122 may be powered by any electrical source, e.g. a solar panel, but is preferably operational without having to connect to a typical power grid to account for environments lacking an electrical infrastructure. Moreover, actuator 122 may be powered via the thermal energy collected by the system as will be explained in subsequent paragraphs. The former approach using a power source provides the added benefit of operation during cloudy conditions.

It should be noted that the electric power is not used to move the lens (the lens is moved by the constant force applied by spring 112). Actuator 122 only requires electricity when it is ON (half a second is enough to disengage a piston from a current track stopping member 114). Once disengaged, frame 104 mechanically moves under the constant force spring and engages the next stopping member 114. Then, it remains idle (no electricity) under the Sun for a predetermined time. As a result, the battery will last several months before needing to be recharged or replaced. Also, as an alternative approach, a solar panel is secured to the flange of lens 102 to keep the battery permanently charged.

An electrically powered actuator 122 may also include a programmable timer, e.g. a cyclical digital time relay, to control the power/actuation of actuator 122. The timer is synchronized with the travel of the Sun across the sky to ensure that lens 102 remains perpendicular, or as close to perpendicular as possible, to the Sun's rays. The timer is preset for the day or several days at the time.

As an alternative, or addition to the timer, solar sensors can be attached at the corners of the lens as an additional method to maintain the lens' perpendicular relation to the Sun. A programming unit energizes the retaining/release mechanism in order to relocate the lens according to the signals from the sensors. Alternately, Solar panels can be attached to the sides of the Fresnel lens to provide electricity to a programming unit and to energize the release/retaining mechanism.

As depicted in FIG. 3, an embodiment may employ counter weights 124 to balance the frame and help keep retaining/releasing mechanism 108 between parallel guide members 118.

Referring now to FIGS. 4-8, an embodiment includes tracking guide 106 in the form of a semi-spherical shell. The exemplary embodiment depicts the shell having a plurality of rectangular apertures defined by a plurality of transversely extending structural members intersecting a plurality of generally vertical structural members, which act as stopping members 114 for this embodiment. In an embodiment, the apertures may have any shape configured to accept piston rod 109 with the perimeter of each aperture acting as a stopping member 114. The shell is manufactured with a radius slightly less than the radius at the outer end of the plunger. Under de-energized conditions, piston rod 109 remains engaged, inside one of the apertures.

Similar to the previous embodiment, tracking guide 106 includes guide members 118 to maintain the pitch of frame 104 through retaining/releasing mechanism 108 residing between guide members 118. Guide members 118 are adapted to temporarily affix to the shell of tracking guide 106 in any desired orientation. In an embodiment, guide members 118 are secured to the spherical grid at marked, pre-defined elevation locations corresponding to the Sun's path. The semi-spherical shell provides a more convenient means for adjusting the height and orientation of guide members 118 in comparison to the previous embodiment's use of several track supports 116, which are each independently adjustable. The semi-spherical shell does not require any of the manual radial, vertical or angular adjustments.

Figure 5:
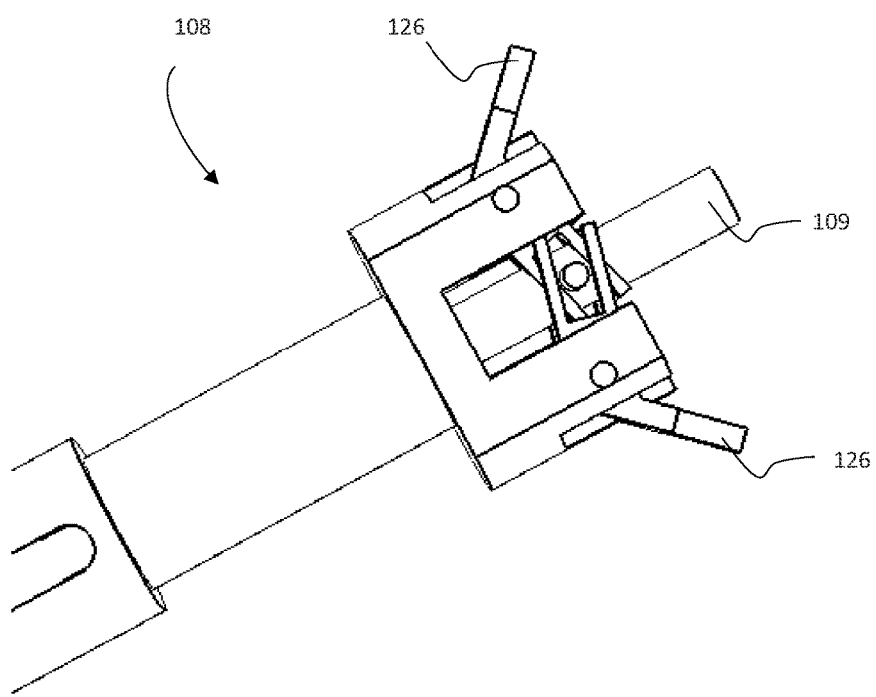
FIG. 5 is a close-up side view of an embodiment of the retaining/release mechanism a first position.
Figure 6:
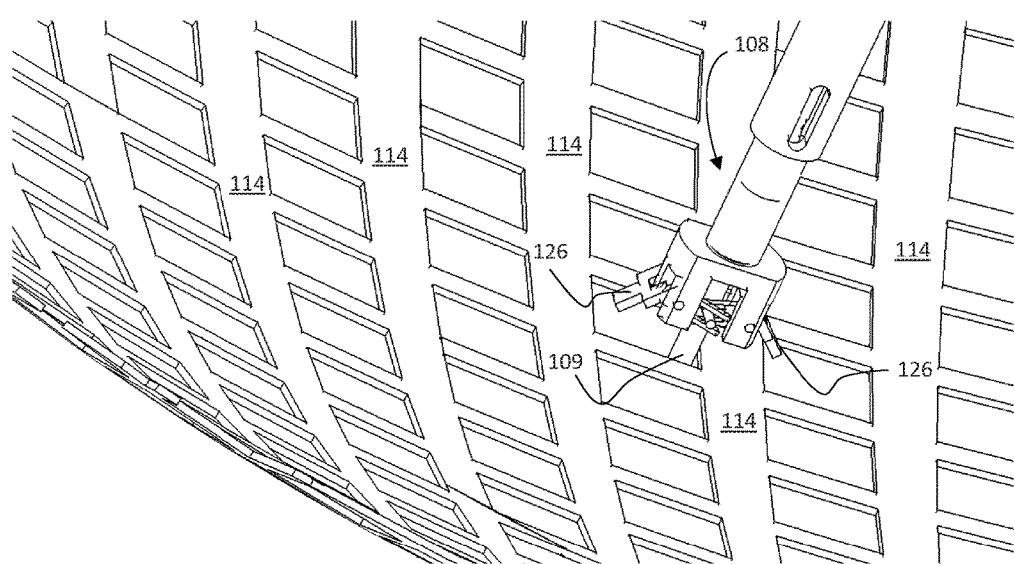
FIG. 6 is a close-up side view of an embodiment of the retaining/release mechanism and the interaction with a tracking guide when the retaining/release mechanism is in the first position.

As depicted in FIG. 5, retaining/releasing mechanism 108 in the present embodiment also has a piston design, but also includes lever arms 126. While the exemplary figure depicts two lever arms 126, it is considered that any number of lever arms can be employed. Lever arms 126 are generally L-shaped with a first end in mechanical communication with piston rod 109, the opposite end free, and the corner of the L-shape pivotally attached to retaining/releasing mechanism 108. The first end being in mechanical communication with piston rod 109. As depicted in FIG. 5, lever arms 126 are opened when piston rod 109 is in an extended configuration. As depicted in FIG. 6, this configuration places piston rod 109 in contact with stopping members 114 and lever arms 126 are disengaged with tracking guide 106.

Figure 7:
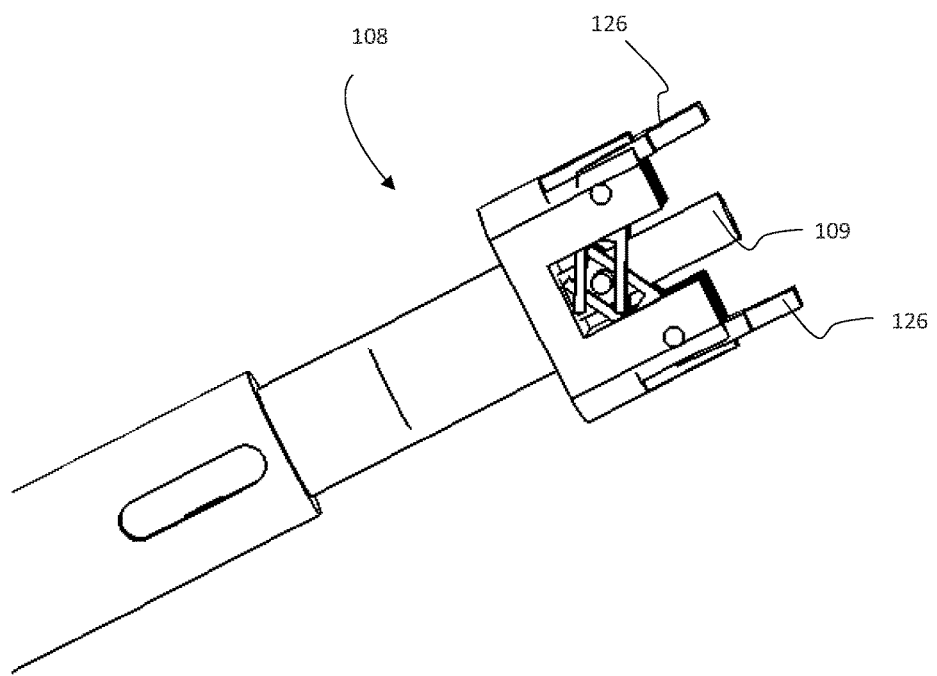
FIG. 7 is a close-up side view of an embodiment of the retaining/release mechanism a second position.
Figure 8:
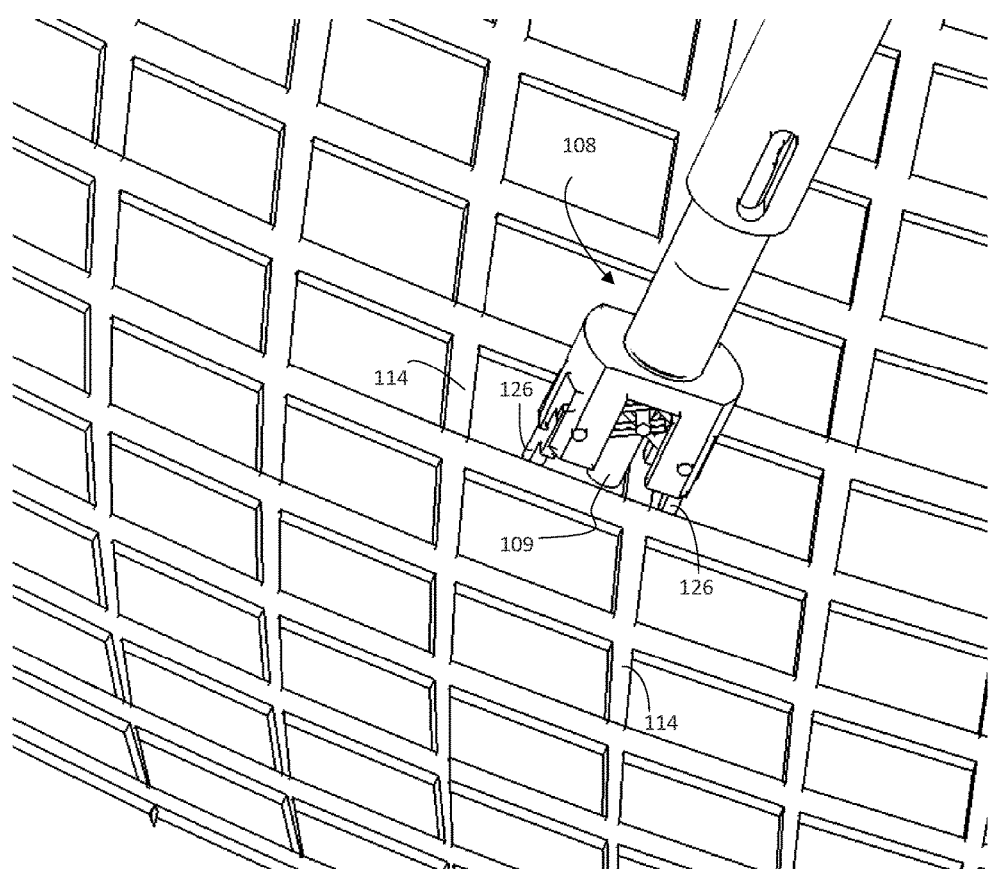
FIG. 8 is a close-up side view of an embodiment of the retaining/release mechanism and the interaction with a tracking guide when the retaining/release mechanism is in the second position.

As depicted in FIG. 7, retracting piston rod 109 causes lever arms 126 to pivot such that the free ends are extending out past piston rod 109. As a result, lever arms 126 engage the next stopping member 114 as shown in FIG. 8. The timely actuation of retaining/releasing mechanism 108 to translate piston rod 109 allows frame 104 to incrementally rotate as retaining/releasing mechanism 108 alternates between the engagement of piston rod 109 and lever arms 126 with stopping members 114.

Figure 9:
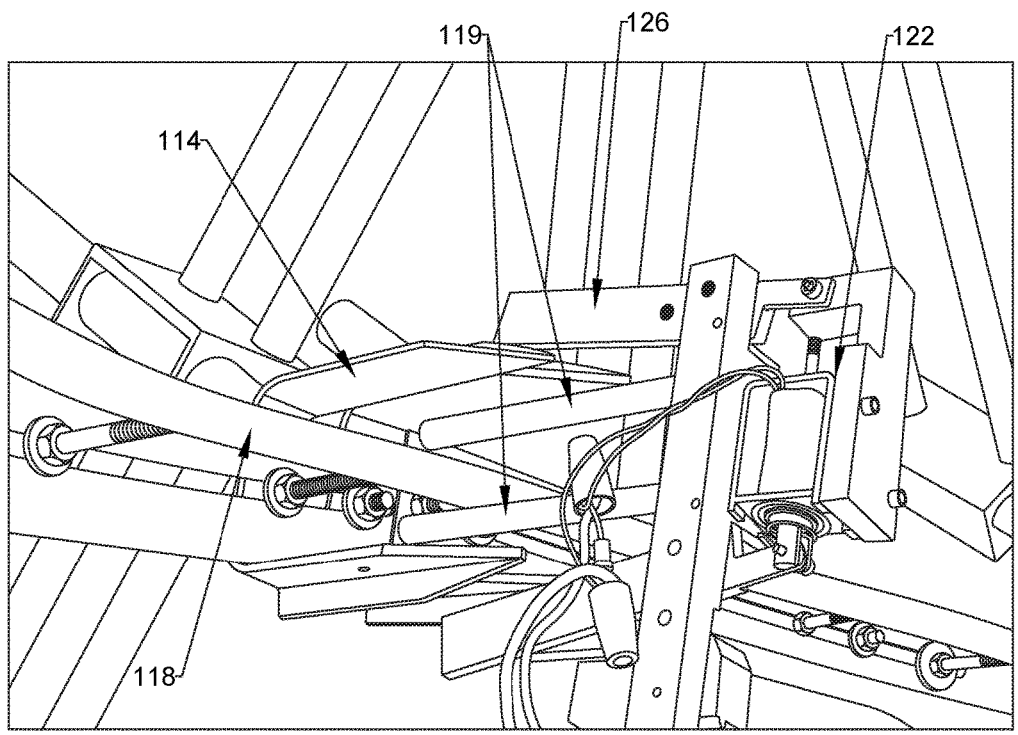
FIG. 9 is a side perspective view of an embodiment of the retaining/release mechanism and the interaction with a tracking guide when the retaining/release mechanism is in the released position.
Figure 10:
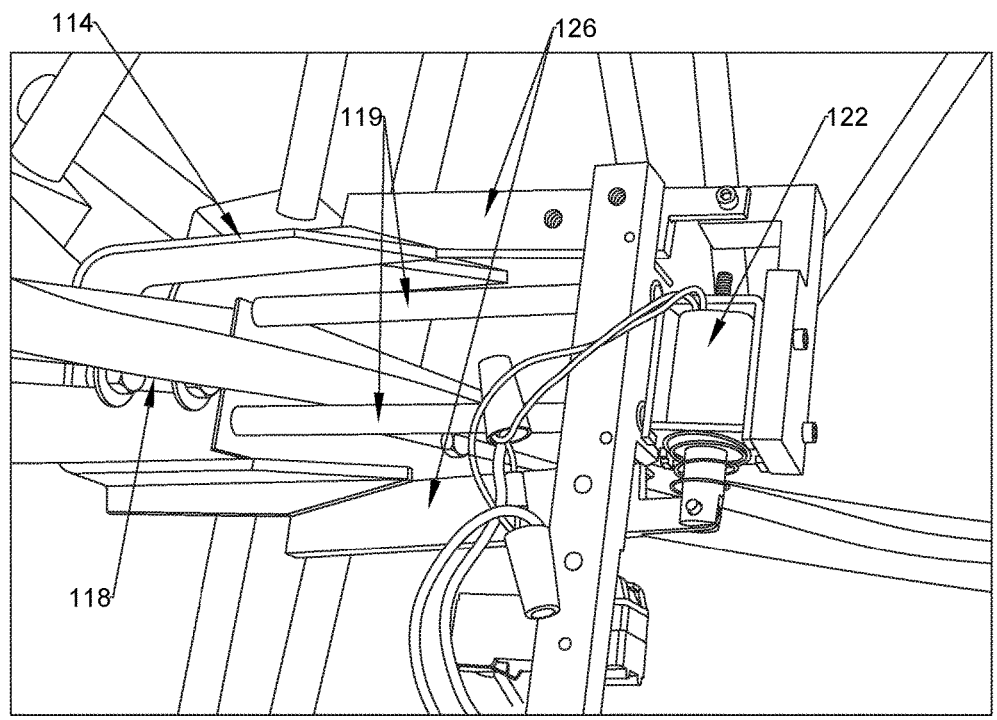
FIG. 10 is a close-up side view of an embodiment of the retaining/release mechanism and the interaction with a tracking guide when the retaining/release mechanism is in the retaining position.
Figure 11:
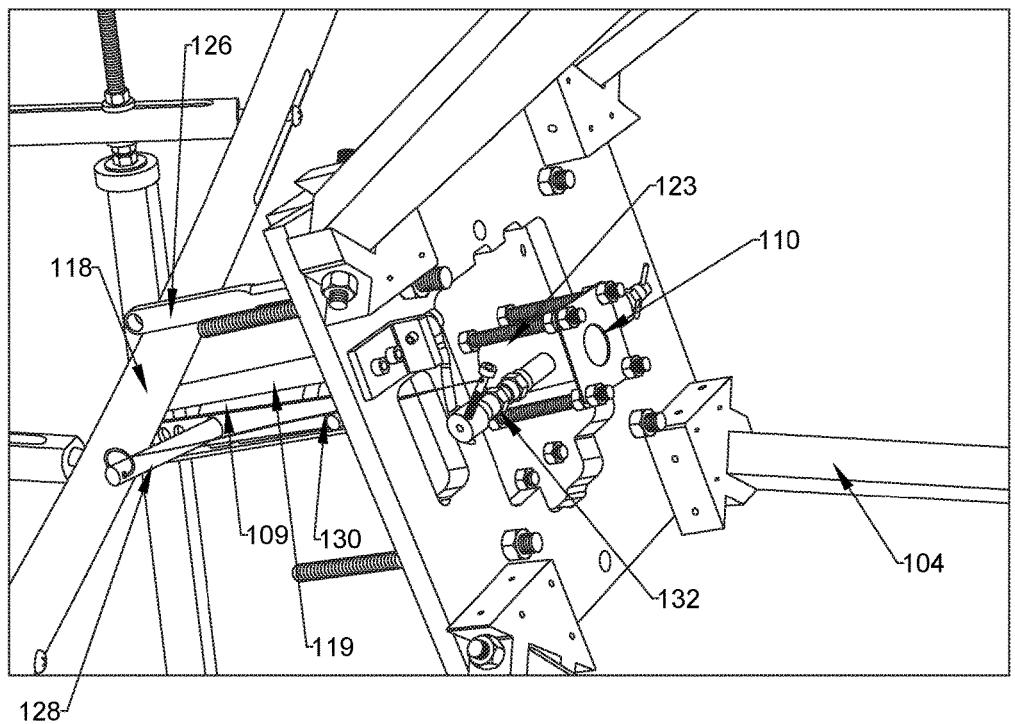
FIG. 11 is a close-up side view of an embodiment of the retaining/release mechanism and the interaction with a tracking guide when the retaining/release mechanism is in the retaining position.

Referring now to FIGS. 9-10, an embodiment has a similar set of mechanisms, but in a different arrangement. Tracking guide 106 includes guide member 118 providing a track along which release/restraining mechanism 108 will travel and a series of, preferably both, upper and lower stopping members 114 above and below guide member 118. Rather than release/restraining mechanism 108 residing between two guide members 118, the present embodiment includes frame guiding members 119 extending from release/restraining mechanism 108, with guide member 118 residing between frame guiding members 119.

Release/restraining mechanism 108 further includes one or more generally longitudinally (with respect to the longitudinal axis of frame 104) arranged lever arms 126 operated by actuator 122. Actuator 122 causes lever arms 126 to pivot into and out of contact with stopping members 114. When actuator 122 is energized, as depicted in FIG. 9, lever arms 126 are pivoted out of contact with stopping members 114. When actuator 122 is de-energized, as depicted in FIG. 10, lever arms 126 are pivoted into a plane in which stopping members 114 are located.

The embodiment preferably includes a timer, which at a predefined setting, operates actuator 122. The timer provides cyclical activation of the actuator, and in turn, disengages release/retaining mechanism 108 with one stopping member 114 and frame 104 rotates towards a subsequent stopping member 114 before actuator 122 causes release/retaining mechanism 108 to return to a position in which release/retaining mechanism 108 can engage the subsequent stopping member 114. The frame guiding members maintain the guidance along the track by the combined effect of: (i) the constant mechanical force that is influencing the frame to rotate about a vertical axis; (ii) a measured mechanical unbalance that is influencing the frame to rotate about a horizontal axis.

Referring now to FIGS. 11-15, an embodiment relies on a pressure actuated piston 123 to actuate release/retaining mechanism 108. Piston 123 is preferably triggered when solar collector 110 transfers thermal energy to a medium within piston 123. Solar collector 110 may have any form known to a person having ordinary skill in the art and preferably contains water or another fluid enclosed inside the collector. The liquid is boiled and steam accumulates, increasing the pressure.

As the heat increases, so does the pressure, and piston rod 109 is forced outwards away from the solar collector and towards guide member 118. String rod 128 is attached to piston rod 109 with string 130 extending between string rod 128 and piston valve 132. As piston rod 109 translates, the distance between string rod 128 and valve 132 will change. Ultimately, this will affect the tension in string 130 causing valve 132 to open or close.

At a predetermined displacement of piston rod 109, string rod 128 coupled to piston rod 109 opens valve 132 releasing the pressure built up in piston rod 109. When the pressure is released, piston rod 109 retracts under the force of spring 134 shown in FIGS. 12 and 14. As piston rod 109 retracts, release/retaining mechanism 108 returns to a retaining position to temporarily secure frame 104 at a particular location along guide member 118.

Figure 12:
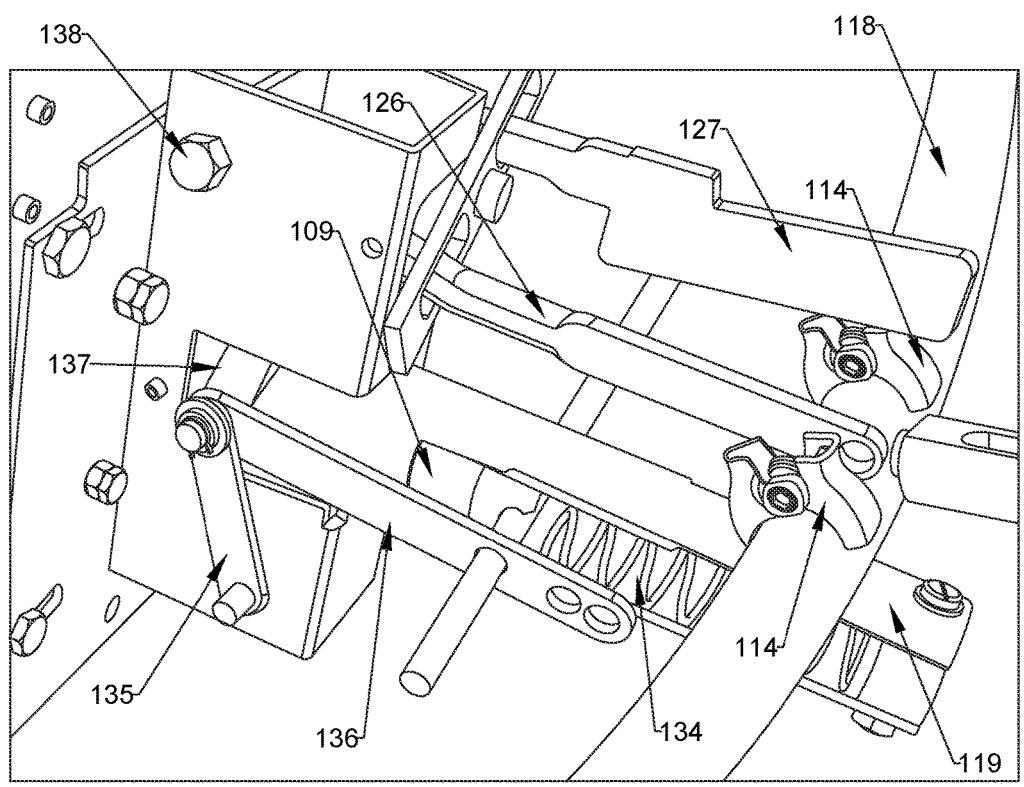
FIG. 12 is a close-up side view of an embodiment of the retaining/release mechanism and the interaction with a tracking guide when the retaining/release mechanism is in a first position.

As most clearly depicted in FIG. 12, piston rod 109 and spring 134 are housed in a hollowed out frame guiding member 119. Frame guiding member 119 provides the structural support for spring 134. In addition, frame guiding member 119 has a preferred length extending past guiding member 118 to help keep guiding member 118 between frame guiding member 119 and lever arm 126 to maintain the pitch of frame 104 as it rotates along guiding member 118.

Piston rod 109 is also in communication with at least one lever arm 126, making up the releasing/retaining mechanism 108. Lever arm 126 is capable of temporarily securing the location of frame 104 along guide member 118 by resting against stopping members 114. A predetermined number of stopping members 114 are located along guiding member 118 at predetermined distances. As piston rod 109 extends and retracts, lever arms 126 are shifted to allow frame 104 to travel incremental distances along guiding member 118.

Figure 13:
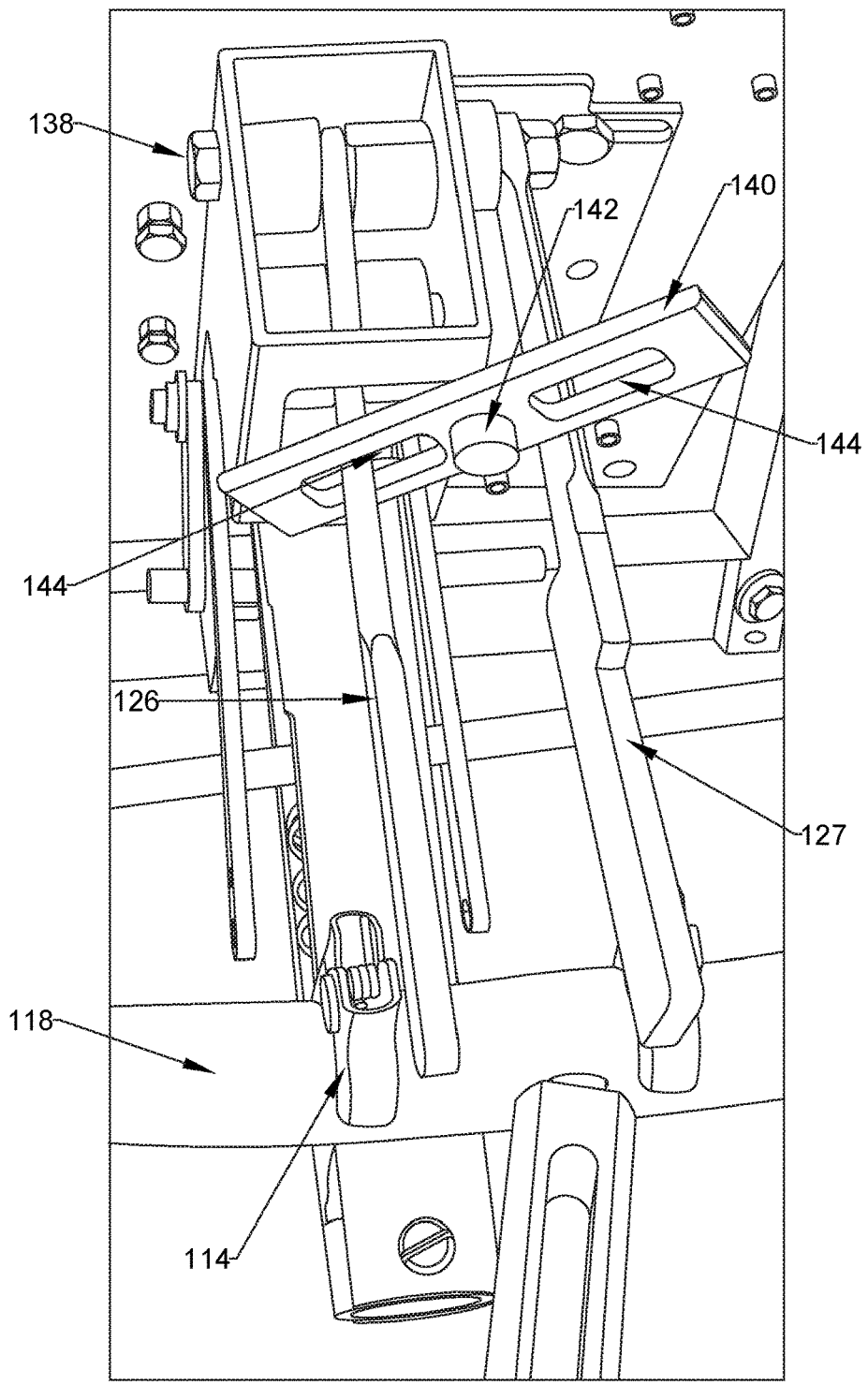
FIG. 13 is a close-up top view of an embodiment of the retaining/release mechanism and the interaction with a tracking guide when the retaining/release mechanism is in the first position.
Figure 14:
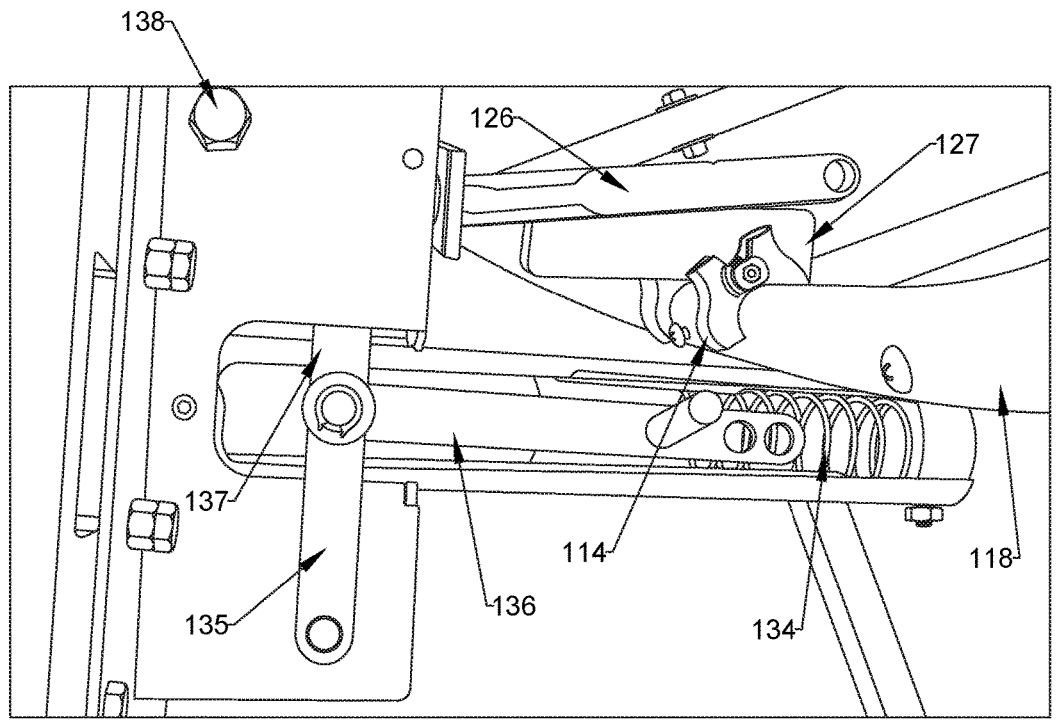
FIG. 14 is a close-up side view of an embodiment of the retaining/release mechanism and the interaction with a tracking guide when the retaining/release mechanism is in a second position.

As depicted in FIG. 12, an embodiment includes two lever arms 126, but it is considered that any number of lever arms may be employed. As depicted in FIGS. 12-14, release/retaining mechanism 108 is preferably configured such that first lever arm 126 is inversely oriented with respect to second lever arm 127. In other words, lever arm 126 is in a contacting orientation (i.e. lowered orientation) with stopping member 114 while second lever arm 127 is in a non-contacting orientation (i.e. raised orientation) with stopping member 114, and vice versa.

The present embodiment of releasing/retaining mechanism 108 includes three mechanical levers 135, 136, 137. Mechanical levers 135, 136, 137 are in mechanical communication with piston rod 109 such that the movement of piston rod 109 causes movement of mechanical levers 135, 136, 137.

As depicted in FIG. 12, first mechanical lever 135 is pivotally secured to both the second and third mechanical levers 136, 137 at one end and is pivotally secured to a fixed section of releasing/retaining mechanism 108 at the second end. Second mechanical lever 136 is secured to first mechanical lever 135 at one end and is mechanical communication with the distal end of piston rod 109 at a second end. Third mechanical lever 137 is pivotally secured to the other mechanical levers at a first end and in mechanical communication with first lever arm 126 at the second end.

Figure 15:
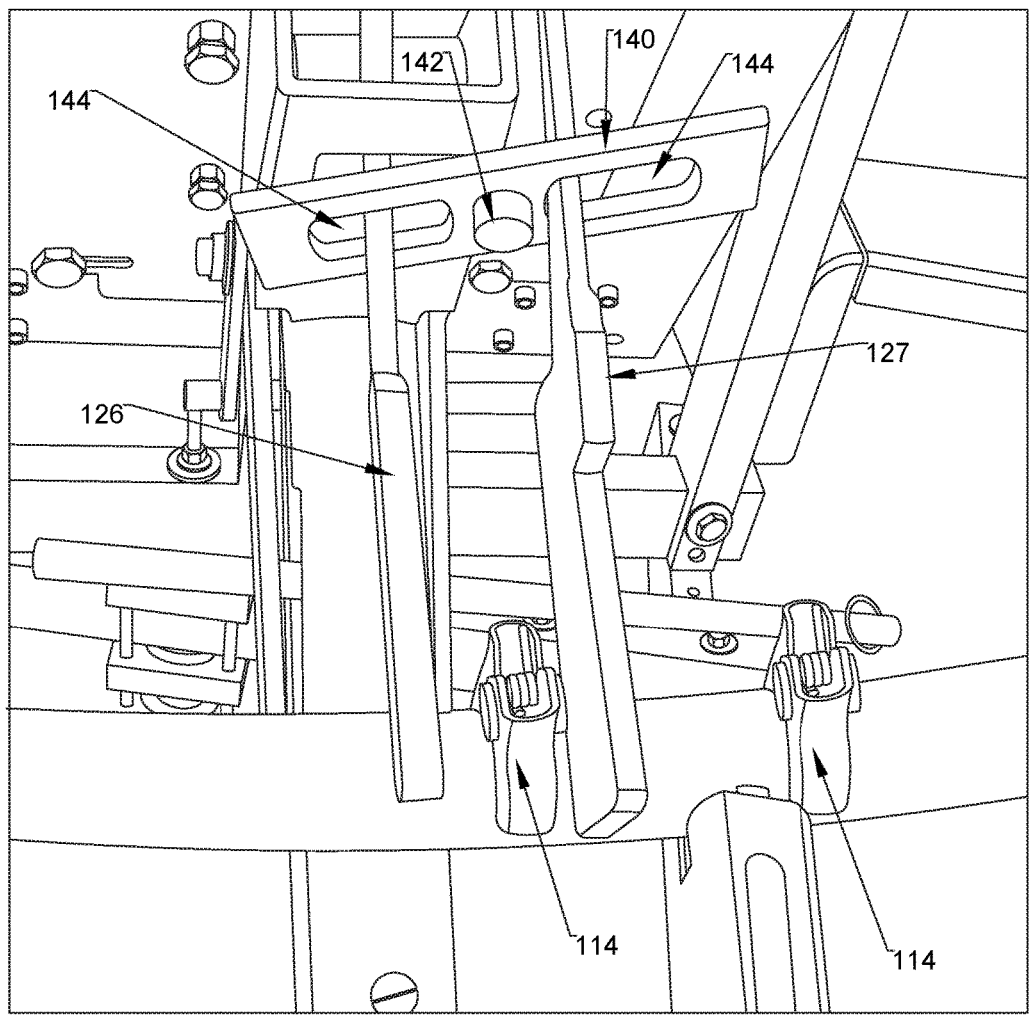
FIG. 15 is a close-up top view of an embodiment of the retaining/release mechanism and the interaction with a tracking guide when the retaining/release mechanism is in the second position.

When piston rod 109 is subject to minimal or no internal pressure, mechanical levers 135, 136, 137 are in a position of repose as depicted in FIGS. 12-13. As piston rod 109 extends outward from internal pressure, it pulls second lever arm 136, which in turn pulls the first ends of mechanical lever arms 135, 136 as depicted in FIGS. 14-15. First mechanical lever 135 is forced into a more vertical position as best shown in FIG. 14, which causes third mechanical lever 137 to also move into a more vertical orientation and ultimately forces the second end of third mechanical lever 137 to increase in vertical position with respect to its vertical position in the position of repose. The second end of third mechanical lever 137 is in mechanical communication with first lever arm 126 at a distal point with respect to pivoting point 138 of first lever arm 126. As a result, the second end of third mechanical lever 137 forces first lever arm 126 to pivot upwardly bringing the distal end of first lever arm 126 out of contact with stopping members 114.

As best depicted in FIGS. 13 and 15, second lever arm 127 is in mechanical communication with first lever arm 126 through a pivoting interconnecting member 140. Interconnecting member 140 has pivot pin 142 generally in located at a midpoint of interconnecting member 140 about which interconnecting member 140 can rotate. Interconnecting member 140 includes lever arm apertures 144 on either side of pivot pin 142, which each receive one of lever arms 126, 127. As shown in FIG. 13, when lever arm 126 is in a contacting position, interconnecting member 140 forces lever arm 127 into a non-contacting position. As shown in FIG. 15, when lever arm 127 is in a contacting position, interconnecting member 140 forces lever arm 126 into a non-contacting position.

Accordingly, releasing/retaining mechanism 108, through mechanical levers 135, 136, 137; lever arms 126, 127; and interconnecting member 140, is configured to adjust the position of frame 104 along guiding member 118 as piston rod 109 translates from varying internal pressure. A typical operation includes first lever 126 is in contact with a stopping member 114 to hold frame 104 at a first track position. Second lever 127 is in not in contact with stopping members 114. When the pressure builds, piston rod 109 extends outwardly and forces mechanical levers 135, 136, 137 to move lever arms 126, 127, such that first lever arm moves out of contact with stopping member 114 and second lever arm 127 drops into a contacting position. The constant rotational force on frame 104 causes frame 104 to rotate until lever arm 127 contacts stopping member 114. Because piston rod 109 is extended, string 130 will open valve 132 and the pressure in piston rod 109 will decrease until piston rod 109 retracts causing the mechanical levers 135, 136, 137, and in turn lever arms 126, 127 to move back to the original position. This cycle will continue throughout the day and frame 104 will slowly rotate along guide member 118.

Releasing/retaining mechanism 108 is tuned to reproduce the cyclic movement of the frame along guide member 118, in order to automatically track the Sun throughout the day. Additionally, the work piston rod 109 produces from applying a force against a resistance as it displaces under the pressure of the steam may be captured and used for other means such as operating other mechanisms.

Glossary of Claim Terms

Actuator: is a device responsible for the movement of a machine or system, including but not limited to a solenoid, motor, thermal expander, and cabling system.

Retaining/Releasing Mechanism: is a device having a first position of repose in contact with a stopping member and a second actuated position that temporarily places the device out of contact with the stopping member Stopping member: is a structure that can engage an object to prevent movement of said object Timer: is a mechanism for activating a device at a predetermined time or time interval.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An apparatus for mechanically tracking the Sun and concentrating the Sun's rays, comprising:
   a lens that concentrates the Sun's rays at a focal point;
   a frame having a first end and a second end with the lens secured near the first end and a solar collector near the second end, wherein the solar collector is located at a distance from the lens that is generally equal to a focal length of the lens, the frame further including a vertical pivoting axis and a horizontal pivoting axis;
   a tracking guide proximate the second end of the frame, the tracking guide having a plurality of stopping members spaced at predetermined intervals and at least one guiding member proximate the plurality of stopping members;
   a retaining/releasing mechanism attached to the second end of the frame, the retaining/releasing mechanism adapted to engage and disengage with the plurality of stopping members;
   an actuator in communication with the retaining/releasing mechanism, wherein the actuator is a pressure operated piston adapted to receive thermal energy received by the solar collector causing a piston rod to extend outward from the piston which in turn actuates the retaining/releasing mechanism and controls whether the retaining/releasing mechanism engages or disengages the plurality of stopping members; and a biasing member applying a constant biasing force on the frame causing the frame to rotate about the vertical axis of the frame when the retaining/releasing mechanism is disengaged with the plurality of stopping members.

2. The apparatus as in claim 1, further comprising a timer in communication with the actuator, the timer controlling the actuation of the actuator.

3. The apparatus as in claim 1, further comprising:
the retaining/releasing mechanism having a piston rod that has a first position of repose and a second actuated position, wherein the movement of the piston rod between the first position and the second position is controlled by the actuator;
the first position of repose including the piston rod extended outward away from the lens at a distance that results in the piston rod contacting one of the plurality of stopping members when the frame rotates the piston rod into contact with one of the plurality of stopping members; and
the second actuated position including the piston rod retracted inward towards the lens such that the piston rod is incapable of contacting one of the plurality of stopping members.

4. The apparatus as in claim 3, further comprising:
the tracking guide having two guide members extending generally in parallel relation to each other with the plurality of stopping members intersecting a plane extending perpendicularly between the two guide members;
the stopping members distally located from the lens a distance greater than a distance between the lens and the two guide members; and
the retaining/releasing mechanism extending distally beyond the two guide members such that the retaining/releasing mechanism at least partially resides between the two guide members.

5. The apparatus as in claim 3, further comprising:
the retaining/releasing mechanism having a lever arm pivotally secured thereto with a first end of the lever in mechanical communication with the piston rod and a second free end, the piston rod thereby adapted to move the lever arm into a first extended position or a second retracted position;
the first extended position of the lever arm being achieved when the piston rod is in the first position of repose, the first extended position of the lever arm including the second free end of the lever arm extending distally beyond the plurality of stopping members such that the second free end is capable of contacting one of the plurality of stopping members; and
the second retracted position of the lever arm being achieved when the piston rod is in the second actuated position, the second retracted position of the lever arm including the second free end of the lever arm residing proximal the plurality of stopping members such that the second free end is incapable of contacting one of the plurality of stopping members.

6. The apparatus as in claim 3, further comprising:
the tracking guide having two guide members temporarily secured to a semi-spherical shell having a plurality of apertures equidistantly disposed therein, wherein the plurality of stopping members are each defined by a perimeter of one of the plurality of apertures;
the two guide members extending generally in parallel relation to each other;
the spherical shell located distally from the lens at a distance greater than a distance between the lens and the two guide members; and
the retaining/releasing mechanism extending distally beyond the two guide members such that the retaining/releasing mechanism at least partially resides between the two guide members.

7. The apparatus as in claim 1, wherein the retaining/releasing mechanism further comprises a lever arm in communication with the piston rod, wherein the translation of the piston rod moves the lever arm between contacting and non-contacting positions with respect to the stopping members, the contacting position preventing the frame from rotating about the vertical axis of the frame and the non-contacting position allowing the frame to rotate a predetermined distance about the vertical axis of the frame.

8. The apparatus as in claim 7, wherein the retaining/releasing mechanism further comprises the piston rod in communication with a valve on the piston, the piston rod adapted to open the valve to release the pressure within the piston when the piston rod extends past a predetermined threshold and close the valve when the piston rod is no longer extended beyond the threshold.

9. The apparatus as in claim 1, wherein the retaining/releasing mechanism further comprises a lever in communication with the actuator, the lever having an open position and a closed position, the actuator altering the lever between the closed and open positions in accordance with a programmable digital timer, and the closed position including the lever in position to contact one of the plurality of stopping members.

10. The apparatus as in claim 1, further comprising mechanisms for harnessing the energy of concentrated solar rays.

11. The apparatus as in claim 1, further comprising the lens being a Fresnel lens.

12. An apparatus for mechanically tracking the Sun and concentrating the Sun's rays, comprising:
a Fresnel lens that concentrates the Sun's rays at a focal point;
a frame having a first end and a second end with the Fresnel lens secured near the first end and a solar collector near the second end, wherein the solar collector is located at a distance from the Fresnel lens that is generally equal to a focal length of the Fresnel lens, the frame further including a vertical pivoting axis and a horizontal pivoting axis;
a tracking guide proximate the second end of the frame, the tracking guide having a plurality of stopping members at predetermined intervals and at least one guiding member in mechanical communication with the plurality of stopping members;
a retaining/releasing mechanism attached to the second end of the frame, the retaining/releasing mechanism adapted to engage and disengage with the plurality of stopping members;
the retaining/releasing mechanism having a piston rod that has a first position of repose and a second actuated position, wherein the movement of the piston rod between the first and second positions is controlled by an actuator;
the first position of repose including the piston rod extended outward away from the lens at a distance that results in the piston rod contacting one of the plurality of stopping members when the frame rotates the piston rod into contact with one of the plurality of stopping members;

the second actuated position including the piston rod retracted inward towards the lens such that the piston rod is incapable of contacting one of the plurality of stopping members;

the actuator in communication with the retaining/releasing mechanism, the actuator adapted to control whether the retaining/releasing mechanism engages or disengages with the plurality of stopping members;

a timer in communication with the actuator, the timer controlling the actuation of the actuator;

a biasing member applying a constant biasing force on the frame causing the frame to rotate about the vertical axis of the frame when the retaining/releasing mechanism is disengaged with the plurality of stopping members;

the tracking guide having two guide members extending generally in parallel relation to each other with the plurality of stopping members intersecting a plane extending perpendicularly between the two guide members;

the stopping members located distally from the lens at a distance greater than a distance between the lens and the two guide members; and the retaining/releasing mechanism extending distally beyond the two guide members such that the retaining/releasing mechanism at least partially resides between the two guide members.

13. The apparatus as in claim 12, further comprising:

the retaining/releasing mechanism having a lever arm pivotally secured thereto with a first end of the lever in mechanical communication with the piston rod and a second free end, the piston rod thereby adapted to move the lever arm into a first extended position or a second retracted position;

the first extended position of the lever arm being achieved when the piston rod is in the first position, the first extended position of the lever arm including the second free end of the lever arm extending distally beyond the plurality of stopping members such that the second free end is capable of contacting one of the plurality of stopping members; and the second retracted position of the lever arm being achieved when the piston rod is in the second actuated position, the second retracted position of the lever arm including the second free end of the lever arm residing proximal the plurality of stopping members such that the second free end is incapable of contacting one of the plurality of stopping members.

14. The apparatus as in claim 12, further comprising:

the tracking guide having two guide members temporarily secured to a semi-spherical shell having a plurality of apertures equidistantly disposed therein, wherein the plurality of stopping members are each defined by a perimeter of one of the plurality of apertures;

the two guide members extending generally in parallel relation to each other;

the spherical shell located distally from the lens at a distance greater than a distance between the lens and the two guide members.

15. The apparatus as in claim 12, further comprising mechanisms for harnessing the energy of concentrated solar rays.

* * * * *